US007097724B2

(12) United States Patent
Hornung et al.

(10) Patent No.: US 7,097,724 B2
(45) Date of Patent: Aug. 29, 2006

(54) ASSEMBLY OF INSULATING GLASS STRUCTURES ON AN INTEGRATED SASH

(75) Inventors: Robert E. Hornung, Southport, CT (US); John S. France, Cuyahoga Falls, OH (US)

(73) Assignee: Sashlite, LLC, Westport, CT (US)

( * ) Notice: Subject to any disclaimer, the term of this patent is extended or adjusted under 35 U.S.C. 154(b) by 0 days.

(21) Appl. No.: 11/070,954

(22) Filed: Mar. 2, 2005

(65) Prior Publication Data

US 2005/0166491 A1 Aug. 4, 2005

Related U.S. Application Data

(62) Division of application No. 10/681,495, filed on Oct. 7, 2003, now abandoned.

(60) Provisional application No. 60/420,392, filed on Oct. 21, 2002.

(51) Int. Cl.
*B32B 37/10* (2006.01)

(52) U.S. Cl. ....................... 156/104; 156/109; 156/286

(58) Field of Classification Search ..................... None
See application file for complete search history.

(56) References Cited

U.S. PATENT DOCUMENTS

| | | | |
|---|---|---|---|
| 2,625,717 | A | 1/1953 | Wampler et al. |
| 3,573,149 | A | 3/1971 | Tibble et al. |
| 3,919,023 | A | 11/1975 | Bowser et al. |
| 4,873,803 | A | 10/1989 | Rundo |
| 5,124,185 | A | 6/1992 | Kerr et al. |
| 5,313,761 | A | 5/1994 | Leopold |
| 5,653,073 | A | 8/1997 | Palmer |
| 5,836,119 | A | 11/1998 | Emmanuel |
| 6,055,783 | A | 5/2000 | Guhl et al. |
| 6,209,269 | B1 | 4/2001 | Valderrama |
| 6,260,251 | B1 | 7/2001 | Guhl |
| 6,286,288 | B1 | 9/2001 | France |
| 6,332,948 | B1 | 12/2001 | Lafond |
| 6,401,428 | B1 | 6/2002 | Glover et al. |
| 6,536,182 | B1 | 3/2003 | France |
| 6,662,523 | B1 | 12/2003 | Hornung et al. |
| 6,679,013 | B1 | 1/2004 | Hornung |
| 6,823,643 | B1 | 11/2004 | France |
| 2002/0189743 | A1 | 12/2002 | Hornung et al. |
| 2003/0084622 | A1 | 5/2003 | Hornung et al. |
| 2003/0205315 | A1 | 11/2003 | McGlinchy et al. |

FOREIGN PATENT DOCUMENTS

| | | |
|---|---|---|
| EP | 1 052 362 A2 | 11/2000 |
| WO | 00/05474 | 2/2000 |

*Primary Examiner*—Jessica Rossi
(74) *Attorney, Agent, or Firm*—Lipsitz & McAllister, LLC

(57) ABSTRACT

A sash frame is provided having a first mounting surface for a first glazing pane and a second mounting surface for mounting a second glazing pane substantially parallel to the first glazing pane. The first and second mounting surfaces are spaced apart to provide an insulating space between the glazing panes. An evacuation opening is provided in communication with the insulating space. The first glazing pane is adhesively mounted to the first mounting surface and the second glazing pane is adhesively mounted to the second mounting surface. Air is allowed to exhaust through the evacuation opening as the insulating space is formed between the glazing panes. A vacuum is drawn from the evacuation opening to draw the first and second glazing panes closer together after the panes have been mounted on their respective mounting surfaces. Mounting of the glazing panes may also be facilitated using a roll press.

13 Claims, 5 Drawing Sheets

ASSEMBLY OF INSULATING GLASS STRUCTURES ON AN INTEGRATED SASH

This application is a divisional of U.S. application Ser. No. 10/681,495, filed Oct. 7, 2003, now abandoned, which claims the benefit of commonly assigned provisional patent application No. 60/420,392 filed on Oct. 21, 2002, the entire disclosure of which is incorporated herein by reference.

FIELD OF THE INVENTION

This invention relates to the fabrication of insulating glass structures on a sash frame having integral spacing and mounting components, and more particularly to the direct mounting of glazing panes to, e.g., a window or door frame using vacuum and/or a roll press to affix the glazing panes to a respective adhesive sealant or the like.

BACKGROUND OF THE INVENTION

When a window, glazed door, skylight or the like is manufactured, a glazing pane assembly is typically mounted to a sash frame using an adhesive sealant in a process known as backbedding. A more recent technology, disclosed, for example, in commonly assigned U.S. Pat. No. 6,286,288 and 6,536,182, provides an integrated sash in which glazing panes are mounted directly to the sash via sealant. In the process of placing a glazing pane (e.g., glass) onto or into the sealant along the sash glazing surface, the glazing pane may be inadvertently pressed beyond the sealant's recommended sealant thickness/height dimension. A recommended sealant thickness may be required to provide an appropriate amount of such sealant to ensure a sealed airspace that will perform to the "life expectancy" of the sash. Sealant viscosity may vary, and therefore the sealant thickness dimension will vary according to the sealant type applied.

It would be advantageous to provide methods for pressing (or pulling) one or more glazing panes against an adhesive sealant bead (or similar material) on an integrated sash structure without producing excessive spreading (also referred to as excessive "whet-out") of the material. It would be further advantageous to provide structure in the integrated sash to control, maintain, and/or direct a consistent and appropriate seal thickness between a glazing pane and a structural mounting surface on the sash. It would be still further advantageous to provide structures and fabrication methods for assuring a suitable bond line between the glazing pane and a glazing surface of a window sash. The present invention provides structures and methods having the aforementioned and other advantages.

SUMMARY OF THE INVENTION

In accordance with one aspect of the invention, a method is provided for fabricating an integrated sash insulating glass unit. A sash frame is provided having a first mounting surface for a first glazing pane and a second mounting surface for mounting a second glazing pane substantially parallel to the first glazing pane. The first and second mounting surfaces are spaced apart to provide an insulating space between the glazing panes. An evacuation opening (e.g., a hole and/or a breather tube) is provided in communication with the insulating space. The first glazing pane is adhesively mounted to the first mounting surface and the second glazing pane is adhesively mounted to the second mounting surface. Air is allowed to exhaust through the evacuation opening as the insulating space is formed between the glazing panes. A vacuum is drawn from the evacuation opening to draw the first and second glazing panes closer together after the panes have been mounted on their respective mounting surfaces.

In one disclosed embodiment, the glazing panes are mounted to their respective mounting surfaces using an adhesive sealant. The vacuum is drawn until edges of the glazing panes are at least partially embedded into the sealant. The evacuation opening is plugged after the vacuum has been drawn.

The insulating space may be filled with an insulating gas via said evacuation opening, after said vacuum has been drawn. The evacuation opening is then plugged after said gas filling step.

Stops ("sealant directors") can be provided on the mounting surfaces to limit whet-out of the sealant. In such an embodiment, the vacuum may be drawn until the glazing panes contact the stops. The evacuation opening is then plugged after said vacuum has been drawn. As described above, the insulating space can be filled with an insulating gas via the evacuation opening, after said vacuum has been drawn. In this case, the evacuation opening is plugged after the gas filling step.

The glazing panes can, for example, be applied to their respective mounting surfaces using at least one roller. In one embodiment, multiple rollers are provided on a roll press. The roller(s) or roll press can also be used to attach a glazing bead for at least one of the glazing panes. In an illustrated embodiment, the glazing bead is attached simultaneously with the mounting of the respective glazing pane to its respective mounting surface. Pressure from the roller(s) can be applied to the at least one glazing pane via the respective glazing bead.

In accordance with another aspect of the invention, a method is provided for fabricating an integrated sash insulating glass unit where the use of a vacuum, as described above, is optional. A sash frame is provided which has a first mounting surface for a first glazing pane and a second mounting surface for mounting a second glazing pane substantially parallel to said first glazing pane. The first and second mounting surfaces are spaced apart to provide an insulating space between the first and second glazing panes. The first glazing pane is mounted to the first mounting surface via an adhesive sealant. The second glazing pane is mounted to the second mounting surface via an adhesive sealant. Surfaces of the first and second glazing panes adjacent to their respective mounting surfaces are pressed into the respective adhesive sealant using at least one roller (e.g., a single roller or a roll press with multiple rollers).

Stops may be provided on the mounting surfaces to limit whet-out of the sealant. Surfaces of the glazing panes can be pressed using the roller(s) to a point at which the glazing panes contact the stops. It is possible for the roller(s) to be used to attach a glazing bead for at least one of the glazing panes. The glazing bead can be attached simultaneously with the mounting of the respective glazing pane to its respective mounting surface. Pressure from the roller(s) may be applied to the glazing panes via the respective glazing bead.

A roll press can be designed to simultaneously press the surfaces of the first and second glazing panes toward their respective mounting surfaces. For example, it is possible for the roll press to comprise successive roller sets that are spaced progressively closer together as said sash frame and glazing panes are transported therebetween.

An evacuation opening, such as a hole or a breather tube, can be provided in communication with the insulating space to allow the escape of air as the glazing panes are mounted to their respective mounting surfaces and pressed by the roller(s). After the glazing panes have been mounted and pressed, the evacuation opening may be plugged. The insulating space can be filled with an insulating gas via the evacuation opening, after the glazing panes have been mounted and pressed. Where gas filling is provided via the evacuation opening, the evacuation opening is plugged after the gas filling step.

BRIEF DESCRIPTION OF THE DRAWINGS

For a further understanding of the present invention, reference will be made to the following detailed description of the invention which is to be read in association with the accompanying drawings, wherein.

DETAILED DESCRIPTION OF THE INVENTION

Figure 1:
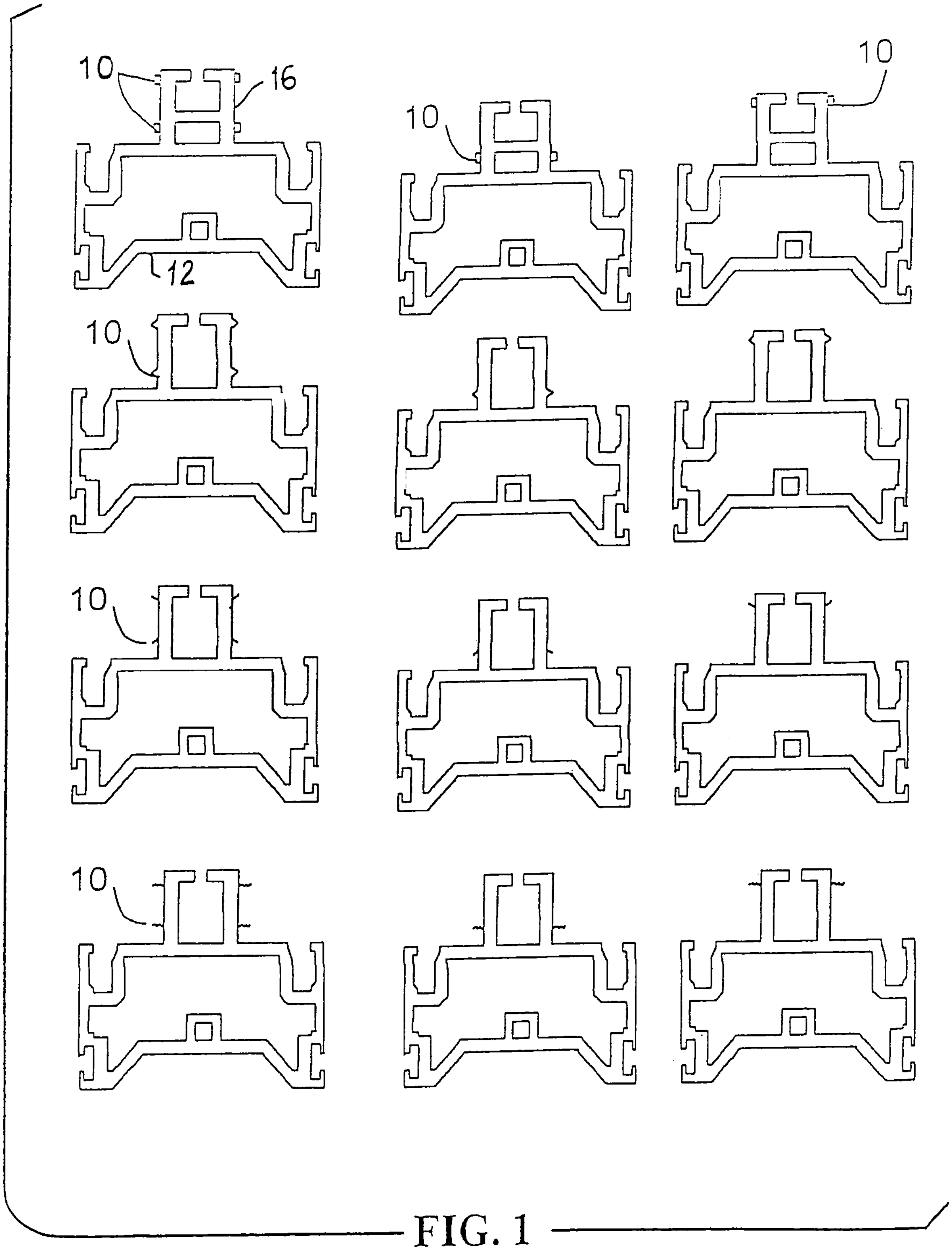
FIG. 1 illustrates various example sash profile configurations, where an integrated spacing and mounting structure includes stops and/or sealant directors.
Figure 2:
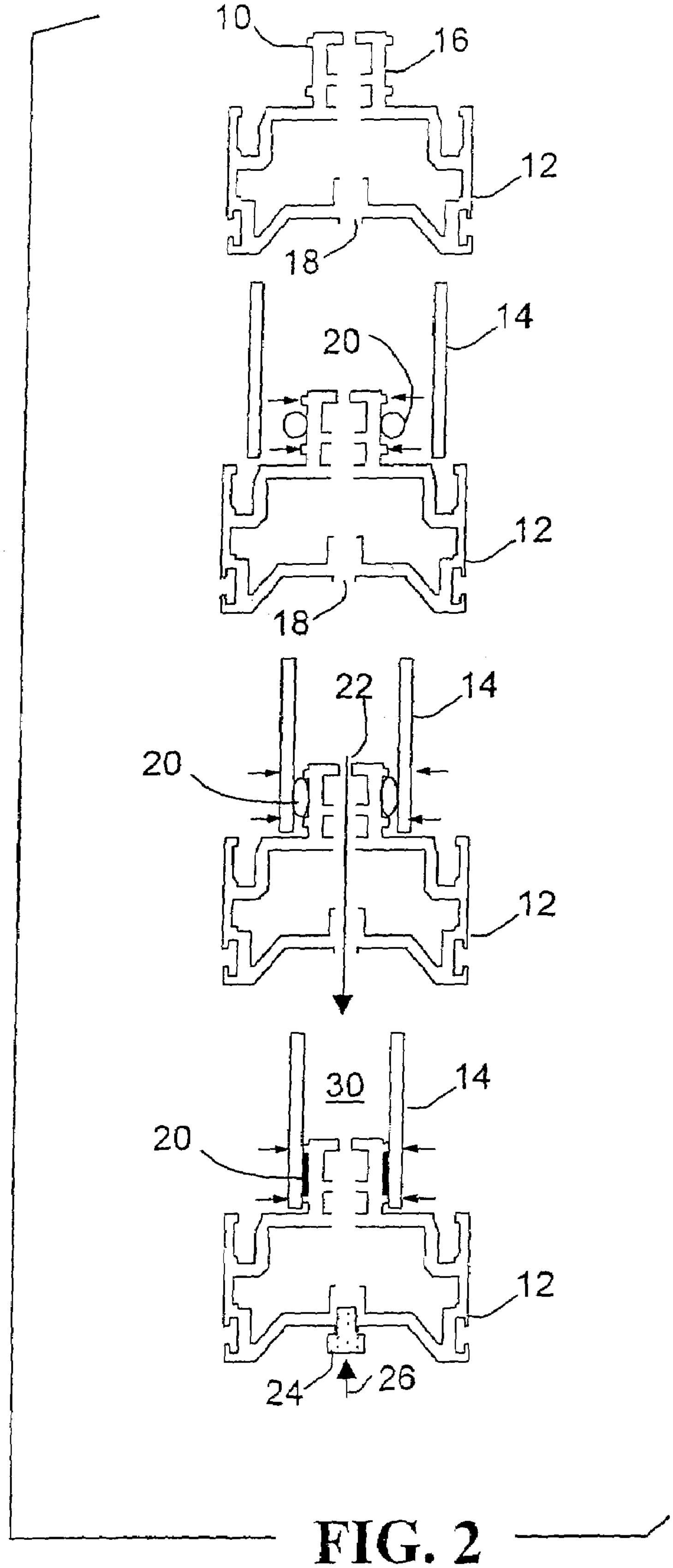
FIG. 2 shows example procedures for fabricating an insulating glass structure on an integrated sash.

Turning now to the drawings, FIG. 1 shows a variety of different embodiments where a sash profile 12 has an integral spacing and mounting structure 16 with sealant directors and/or glazing pane stops 10. The elements 10 serve as sealant directors to prevent adjacent sealant from migrating past them. As can be seen in FIG. 2, the elements 10 can also serve as stops for a glazing pane 14, when the glazing pane is pressed against sealant 20.

"Sealant Directors" or "Whet-out and Compression Limiters" 10 are illustrated in the context of providing a superior seal line and an improved process for establishing appropriate "whet-out" of sealant affixed to the glazing surfaces of the integrated sash. In fabricating windows, doors, skylights and other glazed products using an integrated sash (i.e., where the sash frame has a glazing pane spacing and mounting structure integral therewith), it is desirable to control, maintain and/or direct a consistent and appropriate seal thickness between the glazing pane and the structural mounting surface on the sash. Such control would include the ability to restrict the area to which a sealant/adhesive can propagate as the glazing panes are mounted.

In the process of placing a glazing pane of glass, plastic or other material onto or into the sealant along the sash glazing surface, the glazing panel may inadvertently be pressed beyond the sealant's recommended sealant thickness/height dimension. A recommended sealant thickness may be required to provide an appropriate amount of such sealant to ensure a sealed airspace that will perform to the "life expectancy" of the sash. Sealant viscosities vary, and therefore the sealant thickness dimension will vary according to the sealant type applied. By providing one or more sealant directors, the oozing of sealant beyond a desired area be limited. In addition, the flattening out of the sealant can be limited by using the sealant director as a stop to limit the travel of the glazing pane toward the integral spacing and mounting structure.

Sealant may be applied in a number of ways. It may be applied in a "strip" or "bead" or any other shape that allows for efficient flow from a sealant dispensing unit. The sealant strip or bead may be of any shape such as triangular, oval, round, square, rectangular, or any combination of these or other shapes. While the glazing pane may be manually pressed against the sealant until a final dimension is reached, such an approach is imprecise and relies on the skill of a window assembler.

In one embodiment, the present disclosure contemplates the use of a vacuum to "pull" or "draw" the glazing panels toward, into, or against the sealant bead/strip in a manner that properly adheres the glazing pane to the glazing surface of the sash frame via the sealant. Such an embodiment is illustrated in FIG. 2. In particular, the process starts out with a window frame fabricated from a sash profile 12 such as that shown in the Figure. It should be appreciated that the sash profile illustrated in the Figure is only an example, and that any shape integrated sash profile can be used in connection with the invention. Other possible shapes are disclosed, for example, in the aforementioned U.S. Pat. Nos. 6,286,288 and 6,536,182, as well as in U.S. Des. Pat. Nos. D479,005; D478,675; D478,677; D479,006; D478,676 and D478,678. Additional sash profile configurations suitable for use in connection with the present invention will be apparent to those skilled in the art, after having the benefit of the present disclosure.

As can be seen from FIG. 2, the sash profile may include one or more sealant directors or glazing pane stops 10. An evacuation opening 18, which communicates with an insulating space 30 between parallel glazing panes 14, may also be provided. The evacuation opening can be provided on the edge face of the sash profile as shown, or it could be provided on the side wall of the sash profile. It is preferred to place the opening 18 on the edge face, where it will not be seen when the finished window is installed in a building or the like. Other locations for the evacuation opening may be possible depending on the sash profile shape.

In order to fabricate an insulating glass window, door or the like, sealant 20 is applied, preferably in the form of beads or strips, to respective glazing surfaces of the spacing and mounting structure 16. In the embodiment illustrated in FIG. 2, the sealant 20 is applied between parallel sealant directors/stops 10 provided on each of the glazing surfaces. It should be appreciated that the sealant could be applied to the glazing panes themselves instead of or in addition to applying the sealant to the glazing surfaces of the spacing and mounting structure 16.

As the glazing panes 14 are placed against the sealant 20, air can exhaust from the insulating space between the panes via the evacuation opening 18, in the direction indicated by arrow 22. After the air has been naturally exhausted in this manner, and both glazing panes are in contact with their respective sealant beads or strips, a vacuum can be drawn from the evacuation opening 18. The vacuum would be drawn in the direction indicated by arrow 22, using a suitable probe or nozzle that communicates via opening 18 with the insulating space 30 between the glazing panes. The probe or nozzle (not shown) will seal around or within the opening 18 so that a suitable vacuum can be achieved.

When the vacuum is drawn, the glazing panes will be drawn together in such that the sealant 20 compresses to a desired extent. This can be seen by comparing the bottom two illustrations in FIG. 2. In particular, in the first of these illustrations, the sealant beads shown have an oval cross section. In the bottom view, the glazing panes have been drawn together by the vacuum, and the sealant has been flattened between the sealant directors 10. As can also be seen in the bottom view, once the glazing panes have been drawn toward each other by the amount required to form a proper seal against the sealant, the sealant directors 10 will act as stops to prevent further movement of the glazing panes in this direction.

At the completion of the vacuum drawing stage, the insulating space 30 between the glazing panes can be permanently sealed by inserting a plug 24 into the evacuation opening 18, in the direction of arrow 26. The plug can comprise, for example, rubber, silicone, or any other resilient material that will plug the opening. Alternatively, a screw, bolt or other hardware component, or a dab of adhesive, putty, sealant, molten plastic, etc. could be used as a plug. The intent of plugging the opening is to provide an hermetic seal for the insulating space 30.

Prior to plugging the opening 18, the opening can be used to fill the insulating space with a gas such as Argon, Krypton, or other element or combination thereof that may be used for insulating purposes. Such gasses are commonly used to increase the insulating value of the window or door, etc.

Any of the aforementioned processes or steps may be in tandem, in combination with any other, or function as separate work stations either in-line or as a fully automated process, semi-automated process, or as a manual means of fabrication. Instead of, or in addition to using a vacuum to draw the glazing panes against the sealant, a roller press (also referred to as a "roll press") may be used to apply pressure along the entire edge perimeter of the glazing pane from one side or simultaneously on multiple (e.g., two) sides. A roller mechanism may work in tandem with the aforementioned process steps and follow along the perimeter of the glazing panel(s) so as to compress the glazing pane(s) against the seal line as the "roller" follows the perimeter of the glazing pane(s).

Figure 3:
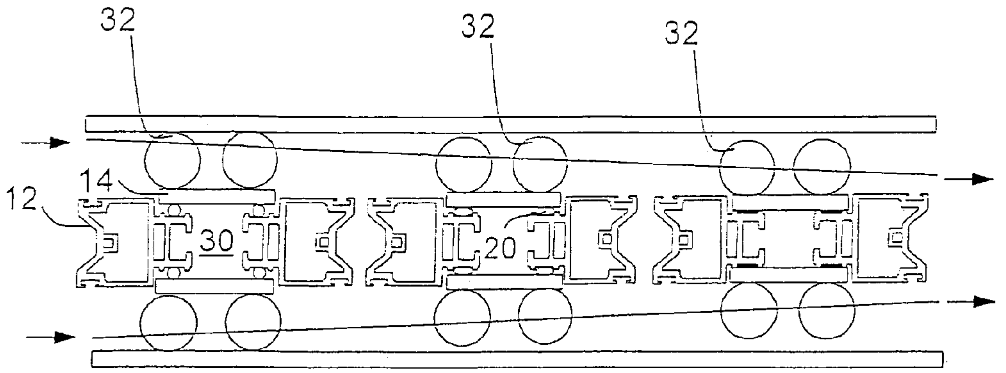
FIG. 3 illustrates the use of a roll press for pressing glazing panes against sealant on the mounting surfaces of an integrated sash.
Figure 4:
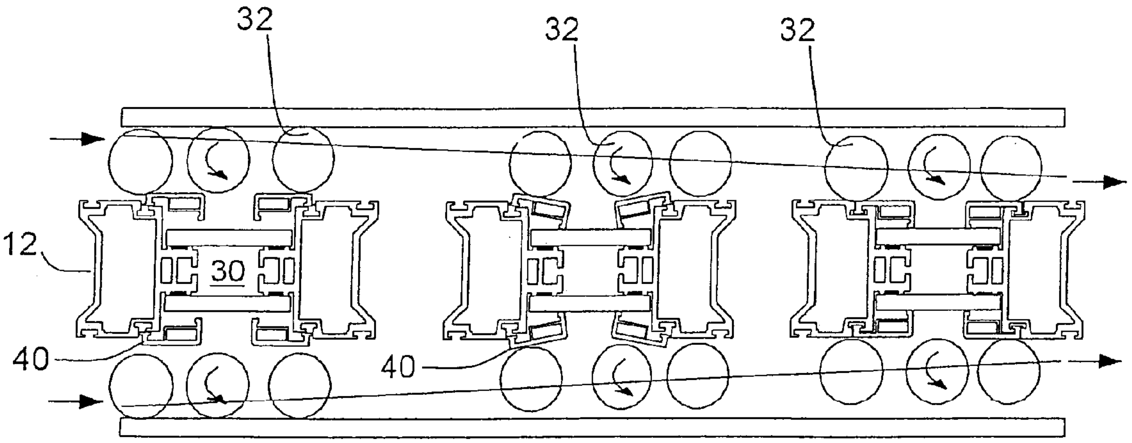
FIG. 4 illustrates the use of a roll press for pressing glazing beads into place on a sash frame, after the glazing panes have been mounted.
Figure 5:
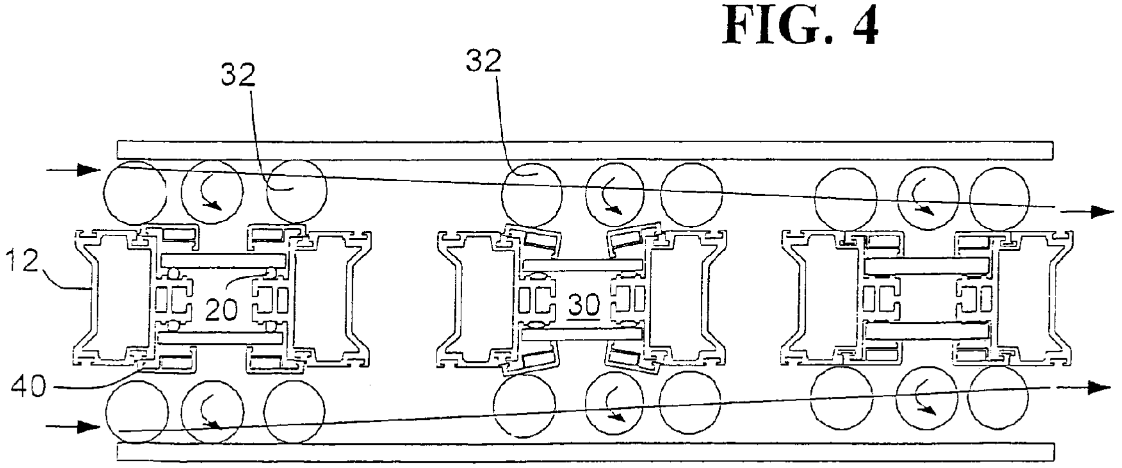
FIG. 5 illustrates the use of a roll press for pressing glazing beads into place on a sash frame, such that the glazing beads press glazing panes against sealant on respective glazing pane mounting surfaces.

Examples of roll press embodiments are shown in FIGS. 3, 4 and 5. In FIG. 3, a window frame fabricated from a sash profile 12 has glazing panes 14 applied thereto. Sealant 20 is sandwiched between the glazing panes 14 and their respective mounting surfaces on the sash profile 12. Rollers 32 are provided to apply pressure to the glazing panes, thereby pressing the glazing pane edges against the sealant to form the desired hermetic seal. As shown in FIG. 3, successive banks of rollers 32 are progressively closer together. This structure allows the glazing panes to be seated closer and closer to the mounting surfaces of the sash frame as the window unit travels through the roll press.

Such a roll press embodiment is useful to "size" the glazing panel to its "finished" condition. Examples of possible implementations include those where the "press" is formed by a series of rollers, wheels or rotating cylinders that may be tapered or otherwise designed to gradually reduce the distance between the opposing compression/pressing mechanism. This process allows for a more gradual "sizing" to occur so as to prevent an immediate pressure on the glazing structure such that the glazing pane may stress to the point of fracture, damage, or irreparable fatigue. FIG. 3 illustrates the general means by which sizing and pressing may be accomplished. A greater or smaller number of pressing mechanisms may be used. Moreover, multiple stations and any combination or type of roller covering or design that may be conducive to providing a finished product that is not scratched, marred, or damaged may be incorporated.

This roll press may be implemented in a vertical, horizontal, or a combination of vertical and horizontal orientations. The process may also be accomplished at some angle in relation to vertical and horizontal. Moreover, the process may be implemented in conjunction with or in line with other processes such as automated sealant placement, automated glazing panel placement, curing and staging areas such as UV curing stations, gas filling stations or processes, vacuum (air evacuation) stations or processes, or any other process or function that may be automated, semi-automated, or manual such that a complete or partial integrated sash is produced.

FIG. 4 illustrates an embodiment where the glazing panes have already been completely seated against the mounting surfaces of sash profile 12. Rollers 32 are provided to progressively attach glazing beads 40 to the sash frame. As illustrated, the first bank of rollers 32 on the left of the drawing contacts glazing beads 40 and presses them in the direction of the glazing panes. The second (middle) bank of rollers 32 urges the front ends of the glazing beads 40 toward the glazing panes. The third (rightmost) bank of rollers applies sufficient pressure to snap the rear ends of the glazing beads 40 into respective locking channels of the sash frame, thereby completing the assembly.

FIG. 5 illustrates an embodiment which combines the functions shown in FIGS. 3 and 4. In particular, the glazing beads 40 are used to apply pressure to the glazing panes, in order to press the glazing pane edges against the sealant 20 to form the desired hermetic seal. As the glazing beads 40 are rolled by rollers 32 to apply pressure to the glazing panes, they also snap in to the window frame at the final roller station, as in the embodiment of FIG. 4.

The compression process shown in FIG. 5 incorporates the glazing bead as a principal means to transfer pressure from the compression mechanism to the glazing panel to the sealant bead for appropriate whet-out of the sealant adhesive. The processes illustrated in FIGS. 4 and 5, like those of the other Figures, may be manual, manual assisted through partial machinery function, or manually applied with a hand tool such as for "rolling" in and/or pressing the bead into position.

Figure 6:
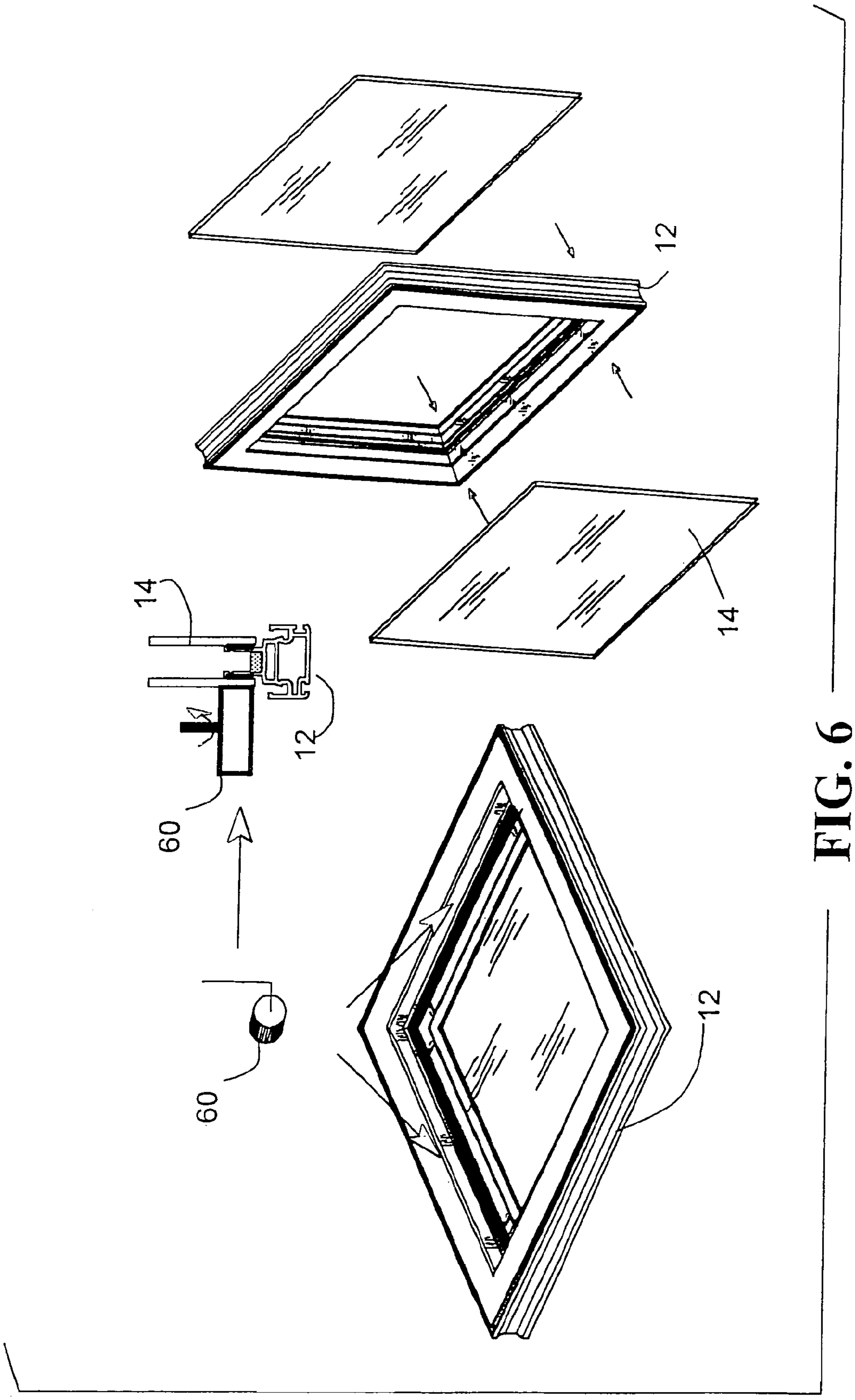
FIG. 6 illustrates the use of a single roller to press glazing panes 14 into sash frame 12.

FIG. 6 illustrates an embodiment where a single roller 60 is used to press a glazing pane 14 against its respective sealant and mounting surface. Such a single roller can be moved automatically (e.g., via robotics) or manually. As the roller 60 reaches a corner of the window sash, it can be redirected to roll out the remaining sides of the window sash. Alternatively, the window frame can be rotated to allow the roller to make a complete path around the perimeter of the frame.

Figure 7B:
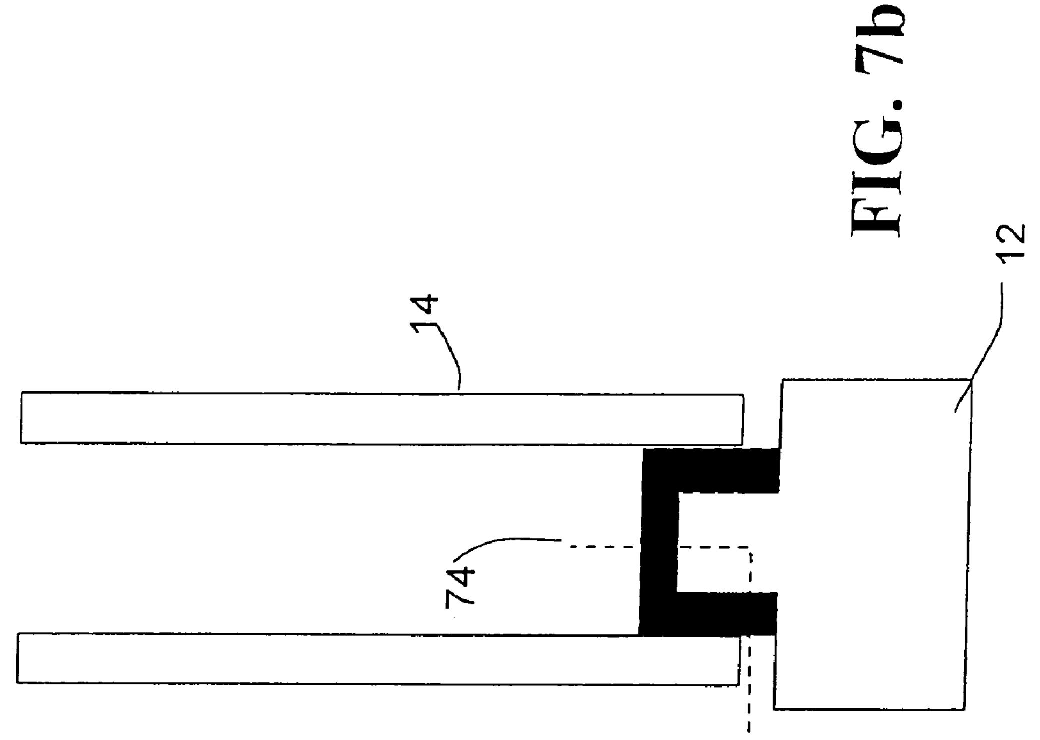
FIG. 7*b* illustrates the use of a second example breather tube coupled to the airspace between the glazing panes
Figure 7A:
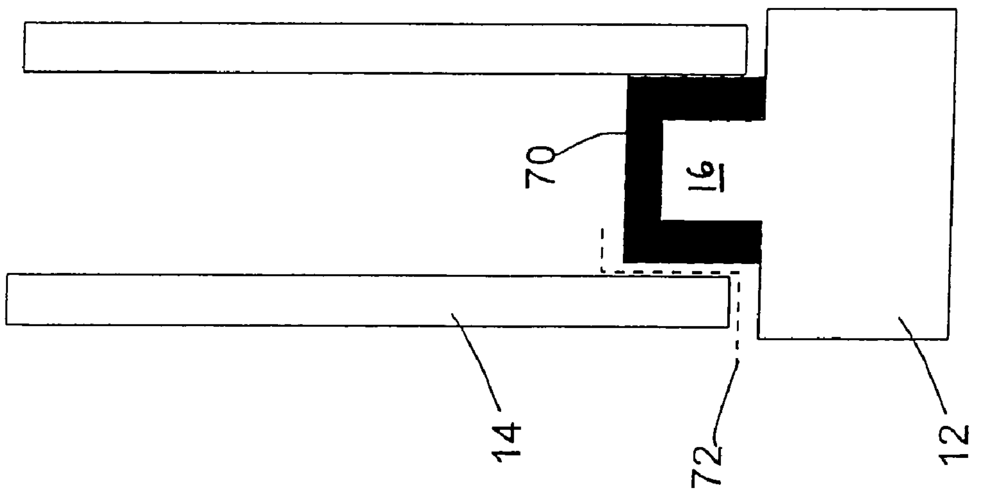
FIG. 7*a* illustrates the use of a first example breather tube coupled to the airspace between the glazing panes.

Instead of an evacuation opening as shown in FIG. 2, a breather tube (72, 74) can be provided as shown in FIGS. 7*a* and 7*b*. The breather tube can allow air to exhaust therethrough when the glass panes are bought together during assembly of the window unit. The breather tube may also be used for drawing a vacuum from the insulating space between the glazing panes, and/or for filling the insulating space with an insulating gas. Plugging of the breather tube may be effected, e.g., by sealing the outside opening thereof with sealant, by pinching or bending the end of the tube, and/or by inserting a suitably sized plug in the open end of the tube. Alternatively, the breather tube can be removed, in which case a dab of sealant can be used to plug any remaining opening if the sealant already present is not viscous enough to self seal.

Each of the embodiments of FIGS. 7*a* and 7*b* show sealant 70 entirely covering the spacing and mounting structure 16. In such an arrangement, the sealant can function as a vapor barrier to prevent the outgassing of vapor (e.g., from the PVC sash). The sealant can also be desiccated. In FIG. 7*a*, the breather tube 72 is installed in the L-seat under the edge of pane 14. Similarly, in FIG. 7*a* the breather tube 74 can traverse the base of the L-seat formed by the glazing pane and the spacing and mounting structure 16. As shown in FIG. 7*b*, an opening (e.g., hole) is required at the top of the spacing and mounting structure, and through the sealant 70, to accommodate the breather tube 74.

After assembling a window unit as described above, it may be desired to cure the seal line. Ultraviolet, microwave, ultrasonic, heat, compression, or any combination of such techniques may be used when and where required along the fabrication line, either by automated, semi-automated, or manual means.

Any or all of the aforementioned functions may be provided in a process that fabricates the finished products via one glazing pane or side per machine cycle or process cycle, or two simultaneous glazing pane applications, or any number more than one per cycle. Sealant/adhesive may also be placed on both the glazing panel perimeter surface and on the sash profile glazing surface. This may facilitate a rapid bonding process wherein similar materials "mate" upon contact, providing an improved seal line. Sealant may be placed on the glazing panel only and then placed onto or against the glazing surface of the substrate.

The sealant bead may be applied at a greater thickness/height dimension than the protruding sealant directors (compression limiters). The glazing pane(s) may be applied either "robotically", "mechanically", and/or "manually." The glazing pane(s) may be pressed upon and/or into the sealant "bead" or "strip" so as to "whet-out" or compress the sealant to the same dimension (or greater) that the sealant director protrudes from the glazing wall or surface of the sash.

The sealant directors may be of any suitable dimension, width, thickness, and/or dimension or location on the glazing surface. The glazing surface may be vertical, horizontal, or a combination of vertical and horizontal surfaces. There may be one, two, or more limiters per glazing surface of the sash. The sealant directors may be of the same material as the sash, of a different co-extruded material, of an applied material or substance, or a tape, caulked bead or strip, or any material or product that will function as a "director" or "compression limiter." The sealant directors may be of any suitable hardness, stiffness, flexibility, rigidness, or softness.

It should now be appreciated that the present invention provides methods for fabricating glazed insulating units directly on a sash frame. Integrated insulating sash units of the type described have many benefits over traditional insulating glass panels. These benefits include increased performance of the sealant/adhesive bead due to a "fixed" location on the sash frame, control of the flow and/or whet-out of the sealant, and the ability to dispense sealant in an efficient manner to reduce the quantity (and thereby, cost) of the sealant used. The disclosed methods also provide an aesthetic improvement that "contains" the seal bead/strip to a given uniform location and dimension with straight and/or uniform edge lines. This could potentially eliminate the need for conventional exterior glazing beads. Bead limiters may also provide a means of improving the bond line and/or seal line for the adhesive/sealant characteristics of the material upon the sash surface, as well as the cohesive properties of the adhesive/sealant.

While the present invention has been shown and described with reference to the preferred mode as illustrated in the drawings, it will be understood by those skilled in the art that various changes in detail may be effected therein without departing from the spirit and scope of the invention as defined by the following claims.

What is claimed is:

1. A method for fabricating an integrated sash insulating glass unit, comprising:

providing a sash frame having a first mounting surface for a first glazing pane and a second mounting surface for mounting a second glazing pane substantially parallel to said first glazing pane, said first and second mounting surfaces being spaced apart to provide an insulating space between said first and second glazing panes with an evacuation opening communicating with said insulating space;

adhesively mounting said first glazing pane to said first mounting surface and said second glazing pane to said second mounting surface;

allowing air to exhaust through said evacuation opening as said insulating space is formed between said glazing panes;

temporarily drawing a vacuum from said evacuation opening to draw the first and second glazing panes closer together after the panes have been mounted on their respective mounting surfaces; and releasing the vacuum after the glazing panes have been drawn together by a desired amount.

2. A method in accordance with claim 1, wherein:

said glazing panes are mounted to their respective mounting surfaces using an adhesive sealant; and said vacuum is drawn until edges of the glazing panes are at least partially embedded into the sealant.

3. A method in accordance with claim 1, comprising:

plugging said evacuation opening after said vacuum has been drawn.

4. A method in accordance with claim 1, comprising:

filling said insulating space with an insulating gas via said evacuation opening, after said vacuum has been drawn; and plugging said evacuation opening after said gas filling step.

5. A method in accordance with claim 1 wherein said evacuation opening comprises a breather tube.

6. A method in accordance with claim 1, wherein:

said glazing panes are mounted to their respective mounting surfaces using an adhesive sealant;

stops are provided on said mounting surfaces to limit whet-out of said sealant; and said vacuum is drawn until the glazing panes contact said stops.

7. A method in accordance with claim 6, comprising:

plugging said evacuation opening after said vacuum has been drawn.

8. A method in accordance with claim 6, comprising:

filling said insulating space with an insulating gas via said evacuation opening, after said vacuum has been drawn; and plugging said evacuation opening after said gas filling step.

9. A method in accordance with claim 1, comprising:
applying said glazing panes to their respective mounting surfaces using at least one roller.

10. A method in accordance with claim 9, wherein a roll press with multiple rollers is used to apply the glazing panes to their respective mounting surfaces.

11. A method in accordance with claim 9, wherein said at least one roller is used to attach a glazing bead for at least one of the glazing panes.

12. A method in accordance with claim 11, wherein said glazing bead is attached simultaneously with the mounting of the respective glazing pane to its respective mounting surface.

13. A method in accordance with claim 11, wherein pressure from the at least one roller is applied to the at least one glazing pane via the respective glazing bead.

* * * * *